(No Model.)

F. GRINNELL.
AUTOMATIC FIRE EXTINGUISHER.

No. 399,522. Patented Mar. 12, 1889.

Attest:
Wm Burnett.
George Seltzer

Inventor:
Frederick Grinnell
by Knight Bros
Attys

UNITED STATES PATENT OFFICE.

FREDERICK GRINNELL, OF PROVIDENCE, RHODE ISLAND.

AUTOMATIC FIRE-EXTINGUISHER.

SPECIFICATION forming part of Letters Patent No. 399,522, dated March 12, 1889.

Application filed February 3, 1888. Serial No. 262,960. (No model.)

*To all whom it may concern:*

Be it known that I, FREDERICK GRINNELL, of Providence, Providence county, Rhode Island, have invented a new and useful Improvement in Automatic Fire-Extinguishers, of which the following is a specification.

The object of my invention is to protect from corrosion, the accumulation of dirt, &c., or mechanical injury those parts of an automatic fire-extinguisher which are brought into action by the heat of the fire to liberate the water.

The invention consists of an air-chamber surrounding and protecting the water-valve and heat-actuated device, the said chamber being provided with an additional valve which is forced off simultaneously with the water-valve, the additional valve serving to keep corrosive gases or dirt out of the air-chamber and yet permitting the passage of the water when liberated by the heat.

It also consists of elastic mechanism adapted to exert pressure upon both valves and thus hold them snugly to their seats, as hereinafter described.

Figure 1:
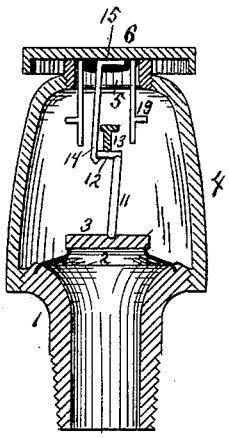
Figure 2:
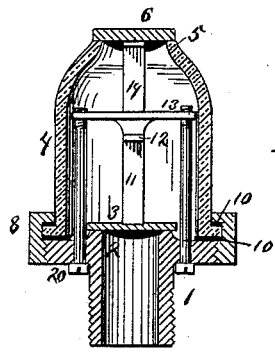

In the accompanying drawings, Figure 1 represents a sectional view of an extinguisher embodying my present improvement. Fig. 2 is a similar view in a plane at right angles to that of Fig. 1 and showing certain modifications in the details.

The lower part of the body 1 of the extinguisher is of the usual form, it having a neck adapted to fit into a water-pipe, and a valve-seat, as at 2, closed by any suitable valve, 3. The valve-seat is preferably on a flexible diaphragm, as shown in Fig. 1. Above this base I form an air-chamber, 4, and in its upper or outer part I form a second valve-seat, 5, upon which rests a second valve, 6. This chamber may be formed integrally with the base 1, or it may be made separate, as shown.

In Fig. 2 the chamber is formed by a glass cylinder or cap, which is held down to the base by the ring 8 and screw-thread 9, the ring bearing down on flange 20 on the cap. Gaskets 10, of suitable yielding material, may be used for packing between the edges of the cylinder and the base and ring, and plaster-of paris may also be used to seal the joint. I may make the outer valve-seat adjustable, as shown in Fig. 1, and it may be made of a non-conductor of heat, so as to keep the heat from being carried away from the valve to the body of the extinguisher.

In Fig. 1 the outer valve is extended so as to form a deflector when open, and it is provided with inwardly-extending hooked guide-arms 19, which engage with the edges of the orifice as the valve moves outward and hold it in a proper position to deflect the water onto the fire.

The heat-actuated device inside the chamber may be of any of the known forms, and it may serve to hold only the water-valve. The other valve not having to withstand any pressure would in such case be simply set in place or lightly fastened—as, for instance,with paraffine. I have shown, however, a heat-actuated device adapted to hold both valves to their seats by the same force. It consists of a strut, 11, bearing upon the water-valve and held down by a lever, 12, which is fulcrumed upon a cross-piece, 13, and whose other end is caught in the hooked end of a piece, 14, soldered to the discharge-valve at 15 with a solder fusible at the temperature at which it is desired to have the extinguisher operate. The cross-piece 13, which may be fastened to the side of the chamber, as in Fig. 1, or to the base, as in Fig. 2, is preferably made flat and flexible or springy, so as to allow the valves to adjust themselves to their respective seats. It is not necessary, however, to use a spring for this purpose when a flexible valve-seat is employed—such as shown in Fig. 1—as the pressure in the pipes will in this case serve to hold both ports closed. The outer port closed by the outer or second valve may be made smaller or of the same size as the inlet-port, so as to form the discharge-port for the water. The guide-arms on the outlet-valve may be extended beyond their hooked portions so as to form obstructions preventing the stopping of the outlet by the inlet-valve when it is thrown from its seat by the water. The outer valve which is exposed on the outer surface may be coated on that surface with paint or an electroplate of gold or platinum, or it may be made of any metal not liable to corrode in the atmosphere in which it is to be used. It will be seen that both the valve-orifices are small enough to present no difficulties in fitting—a feature that is of considerable importance, as both valves must be air-tight.

In this extinguisher everything at all liable to corrosion that cannot on account of its having certain motions be painted or otherwise protected is protected by being placed within the air-chamber. The air-chamber also prevents the accumulation of dirt in the joints of such moving parts, and also prevents the moving parts from being bent or otherwise mechanically injured so as to interfere with their proper operation. In fact this method of constructing an automatic sprinkler with the valve-controlling heat-actuated device inclosed in a practically air-tight chamber renders it possible to make the said device in various desirable forms, which would be impracticable if they were not so inclosed and protected.

I do not confine myself in this invention to the use of any particular form of valve-controlling heat-actuated device, for although I have shown only a device held by fusible solder the invention is equally applicable for the protecting of any heat-actuated device.

I claim—

1. The combination, in an automatic fire-extinguisher, of an air-chamber, a supply-pipe, a valve closing an inlet-port from the supply-pipe to the air-chamber, a second valve closing a discharge-port from said air-chamber, and a heat-actuated device holding both of said valves closed and located entirely within the air-chamber independently of either valve-seat, substantially as and for the purpose set forth.

2. The combination, in an automatic fire-extinguisher, of an air-chamber, a supply-pipe, a valve closing an inlet-port from the supply-pipe to the air-chamber, a second valve closing a discharge-port from said air-chamber, a heat-actuated device located entirely within said air-chamber, and a lever connected at one end to said heat-actuated device and bearing upon one of said valves at its other end, substantially as set forth.

3. The combination, in an automatic fire-extinguisher, of an air-chamber, a supply-pipe, a valve closing an inlet-port from the supply-pipe to the air-chamber, a second valve closing a discharge-port from said air-chamber, a heat-actuated device located entirely within said air-chamber, a lever, a rod connecting one end of said lever with said heat-actuated device, the rod 11, supporting the other end of said lever and resting upon one of said valves, and an elastic medium against which said lever bears, substantially as set forth.

FREDERICK GRINNELL.

Witnesses:
RICHARD W. GRINNELL,
WILMARTH H. THURSTON.